Figure 1:
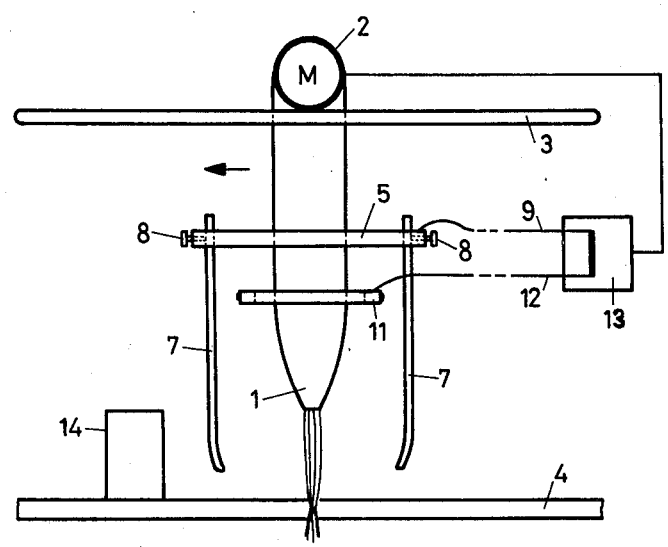

United States Patent [19]

Schmall

[11] 4,356,362

[45] Oct. 26, 1982

[54] HAZARD SWITCH ARRANGEMENT

[76] Inventor: Karl H. Schmall, Waldstrasse 20, D-7570 Baden-Baden 19, Fed. Rep. of Germany

[21] Appl. No.: 208,937

[22] Filed: Nov. 21, 1980

[30] Foreign Application Priority Data

Dec. 20, 1979 [CH] Switzerland ............ 11306/79

[51] Int. Cl.³ ........................................ H01H 3/16
[52] U.S. Cl. ............................. 200/47; 200/61.41; 200/334
[58] Field of Search ............ 200/47, 61.41, 61.42, 200/61.43, 334; 340/686, 689, 51, 61

[56] References Cited

U.S. PATENT DOCUMENTS

| | | | |
|---|---|---|---|
| 3,017,618 | 1/1962 | Cross | 200/61.41 |
| 3,207,870 | 9/1965 | Herrera et al. | 200/61.41 |
| 3,323,334 | 6/1967 | Richards et al. | 200/61.41 |

FOREIGN PATENT DOCUMENTS 1234162  10/1960  France ..................... 200/61.41

*Primary Examiner*—Willis Little
*Attorney, Agent, or Firm*—Connolly and Hutz

[57] ABSTRACT

The invention relates to a hazard switch arrangement for flame-cutting and welding units. As the feeler for detecting mechanical obstacles (14) in the path of the torch nozzle (1), a plurality of feeler rods (7) is provided here. The feeler rods (7) are connected in each case to a plurality of movement switches (holder ring (5), contact ring (11) and feeler rods (7)). The multiplicity of feeler rods and movement switch arrangements guarantees prompt and reliable hazard warning in operation. In a preferred embodiment of the invention, the feeler rods themselves serve as the movement switches.

6 Claims, 4 Drawing Figures

HAZARD SWITCH ARRANGEMENT

The invention relates to a hazard switch arrangement of flame-cutting and welding units in which a torch is moved in at least one axis by a servomotor as a function of control signals which can be preset, and wherein a feeler is provided in the region of the torch nozzle, which feeler is connected to an emergency switch device and emits a warning signal, to prevent damage to the torch, when obstacles occur in the direction of motion of the torch nozzle.

In flame-cutting and welding units, a torch nozzle is moved at a relatively high speed across the workpiece which is to be worked. During this motion, mechanical obstacles which would cause damage to the torch can occur in the path of the torch. For this reason, hazard switch arrangements for lifting or stopping the torch in the event of obstacles occurring have already been employed. A hazard switch arrangement of this type is described, for example, in German Offenlegungsschrift No. P 27 26 648.4 by the inventor.

In certain applications, arrangements of this type with a distance switch have proved not to be the optimum. In particular, the responsiveness and the width of the area to be monitored are still capable of improvement.

According to the invention, this is achieved, above all, when the feeler comprises a plurality of feeler rods which screen the torch at least in the direction of motion, and when the feeler rods are connected to a plurality of movement switches for activating the emergency switch device.

The provision of a plurality of feeler rods which are connected to a plurality of movement switches makes it possible, in a manner of optimum simplicity and at low cost both in design and in manufacture, to reduce the mass of the feelers substantially and to increase the responsiveness in this way. This is achieved, even though a virtually unlimited density of feelers and hence the simplest possible adaptation to the torch configuration can be obtained by this arrangement. Moreover, the individual feeler rods, or limit switches, can be individually adjusted and set, whereby the responsiveness can be further increased. Additionally, the movement switches can be designed very simply, since each feeler rod is deflected by obstacles in only one direction.

The feeler arrangement becomes particularly sensitive when each individual feeler rod is connected to a movement switch. Advantageously, however, the arrangement can also be simplified by connecting the feeler rods in groups to a movement switch.

The invention can be realized in a manner which is particularly advantageous and is both fault-proof in operation and constructionally simple, when the feeler rods themselves are at least in part electrically conductive and are constructed as the switching element of the movement switch. The feeler rods thus form a part of the movement switch, as a result of which not only is the switching element saved but the responsiveness is also improved, since a deflection of the force and a transmission of the deflected motion to a separate switching element are avoided.

The construction can be optimized further when the feeler rods are fixed to a common holder. In this way, the overall arrangement of the feeler rods and of the movement switch can simply be mounted on the torch nozzle, without thereby increasing the mechanical outlay.

Particularly if the holder is electrically conductive at least sectionally and serves to connect the feeler rods to the emergency switch device, the mode of operation and ease of servicing are further improved. In fact, any separate electrical feed line to the individual rods can be omitted in this way and the simplicity of connecting an individual switch is combined in this arrangement with the responsiveness and the further advantages of a multiple feeler arrangement.

Evidently, the technical advance and the inventive content of the subject of the application are ensured both by the new individual characteristics and, in particular, also by the combination and sub-combination of the characteristics put to use.

Figure 2:
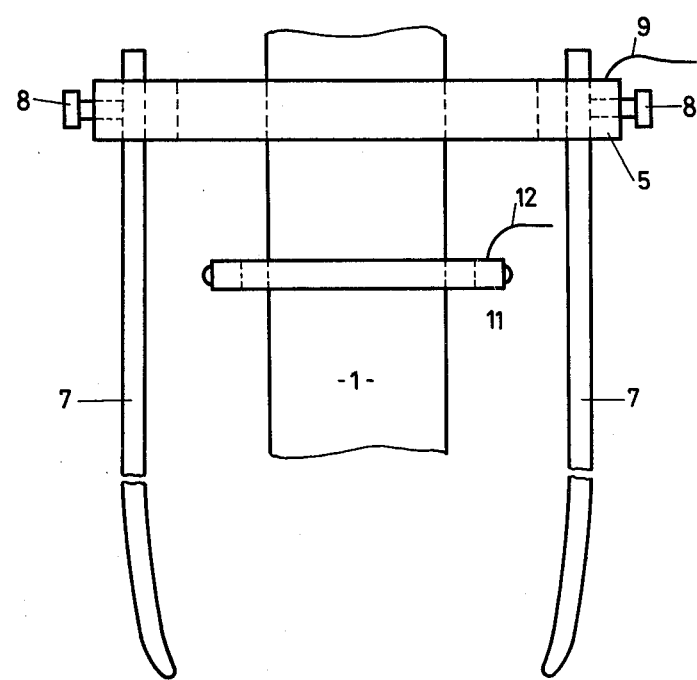
Figure 3:
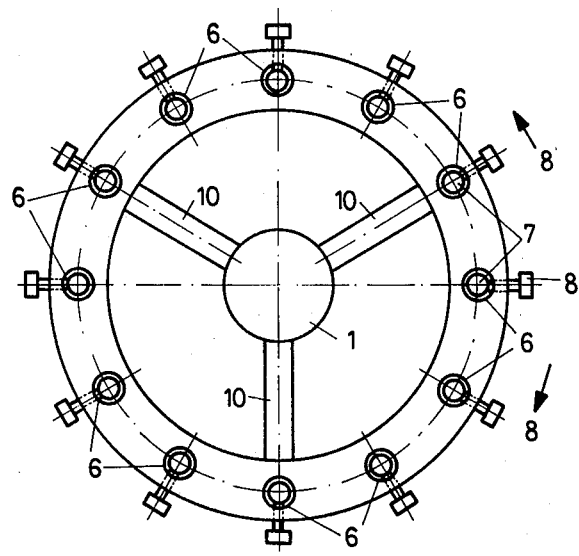
Figure 4:
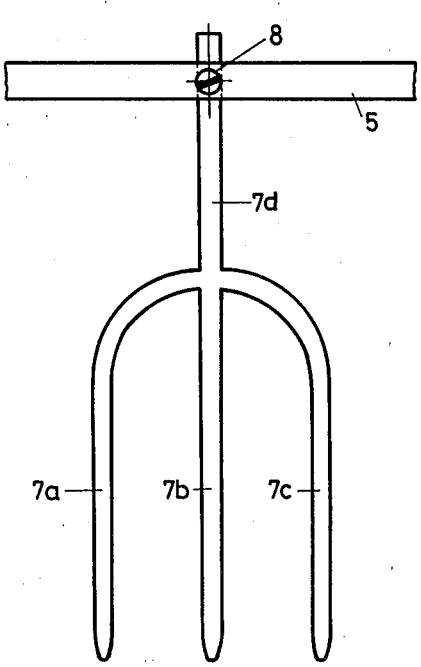
Figure 5:
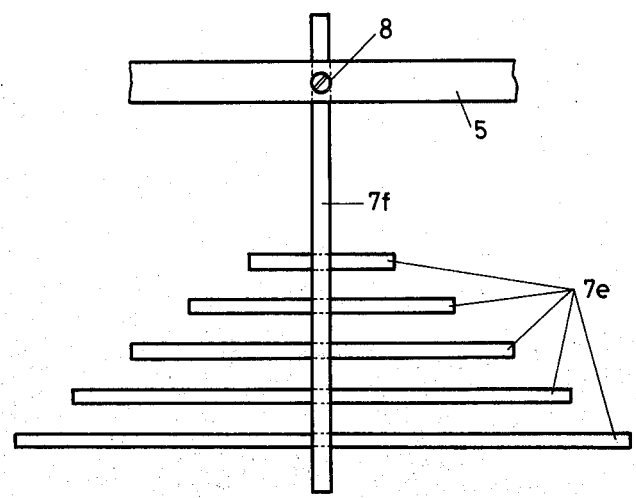

In the following text, the invention is explained in more detail in illustrative embodiments by reference to the drawings in which:

FIG. 1 shows a diagrammatic representation of a hazard switch arrangement having the characteristics of the invention, in side view, FIG. 2 shows the arrangement of the feeler rods according to FIG. 1 on an enlarged scale, FIG. 3 shows a plan view of the arrangement according to FIG. 2, FIG. 4 shows a modified illustrative embodiment of a feeler rod, FIG. 5 shows a further illustrative embodiment of a feeler rod.

According to FIG. 1, the torch nozzle 1 of an automatic welding unit is arranged and connected to a servomotor 2 in such a way that the overall arrangement can be moved along a rail 3 parallel to a workpiece 4. On the torch nozzle 1, an annular holder 5 is provided which has a plurality of bores 6. Feeler rods 7 can be clamped into the bores 6 by means of set screws 8.

The holder 5 is manufactured from an electrically conductive material so that all the feeler rods 7, which likewise consist of an electrically conductive material, are at the potential of a connecting line 9. Since the holder 5 is joined on the other side to the torch nozzle via insulators 10, only the holder 5 itself and the feeler rods 7 are at the potential of the connecting line 9.

Below the holder 5, a contact ring 11 is joined to the torch nozzle 1, likewise by means of insulators which are not shown. The external diameter of the contact ring 11 is somewhat smaller than the cylindrical screen formed by the feeler rods 7. The contact ring 11 in turn is connected by means of a second connecting line 12 to an emergency switch device 13.

As soon as the advancing torch nozzle 1 in operation enters the range of an obstacle 14, the feeler rods 7 located in the direction of motion of the torch nozzle 1 are bent back, as shown in broken lines in FIG. 1. The feeler rods 7 thus come into contact with the contact ring 11 and hence close the contact between the connecting line 9 and the connecting line 12. This contact closure has the effect that the emergency switch device 13 is activated in a manner known per se and that the motor 2 is stopped, before the torch nozzle 1 can be damaged by the obstacle 14.

Of course, the arrangement can also be designed in such a way that the emergency switch device 13 simultaneously emits an acoustic or visual warning signal and/or initiates a lifting of the torch nozzle 1 and a separation from the workpiece 4. Arrangements of this type form part of the state of the art and do not need to be described here in more detail.

For the sake of simplicity, only two feeler rods 7 which are fixed by means of set screws 8 in the bores 6 are shown in FIGS. 1 to 3. This representation, however, has been selected only for simplicity in order to enable the overall arrangement to be shown more clearly. In practice, a plurality of feeler rods will be mounted in each of the bores 6 in order to screen the torch nozzle in every direction of motion.

If, for example, the torch nozzle 1 is here moved only in the forward direction, as can be the case with severance-cutting machines, it is possible to provide, for example, only three or four feeler rods 7 in the direction of motion of the torch nozzle. It is also conceivable, for example, to remove feeler rods 7 from one side, when cutting along a step or other prominences, in order to be able to guide the torch nozzle 1 more closely along such a prominence, when moving parallel to the latter.

Moreover, it is obviously also conceivable to adapt the configuration of the feeler rods 7 to a given torch nozzle 1 in such a way that the distance between the feeler rods 7 and the torch nozzle 1 is selected so that a reliable emergency switch-off in accordance with the speed of advance of the motor 2 is ensured. Moreover, the distance between the feeler rods 7 and the relative height of the feeler rods 7 relative to the torch nozzle 1 can obviously be adjusted in such a way that any type of obstacle is reliably detected.

FIG. 4 shows a modified illustrative embodiment in which three feeler rods 7a, 7b and 7c are combined and end together in a feeler neck 7d. Such an arrangement is advisable above all whenever the feeler spacing is narrow and is designed for the detection of very small obstacles.

FIG. 5 shows a modified illustrative embodiment in which a number of feeler rods 7e are combined and fixed together to a feeler rod 7f. Such an arrangement proves suitable above all, whenever narrow obstacles in the direction of motion of the torch nozzle 1 are expected.

Evidently, the invention can be very widely adapted to individual requirements, while preserving the advantage of the ready exchangeability of the individual feeler rods and the high responsiveness, coupled with a very simple mechanical construction. The concentric arrangement according to FIGS. 1 to 3 makes it possible to realise the invention in a manner which is of optimum simplicity and very inexpensive to manufacture.

I claim:

1. In a hazard arrangement for flame-cutting and welding units in which a torch is moved in at least one axis by a servomotor as a function of control signals which can be preset, and wherein the arrangement includes a feeler provided in the region of the torch nozzle, said feeler being connected to an emergency switch device and and emitting a warning signal to prevent damage to the torch, when obstacles occur in the direction of motion of the torch nozzle, characterized in that said feeler comprises a plurality of feeler rods which screen the torch at least in the direction of the motion, and that said feeler rods are connected to a plurality of movement switches for activating said emergency switch device.

2. Switch arrangement according to claim 1, characterized in that each individual feeler rod is connected to a movement switch.

3. Switch arrangement according to claim 1, characterized in that said feeler rods are connected in groups to a movement switch.

4. Switch arrangement according to claim 2 or 3, characterized in that said feeler rods themselves are at least in part electrically conductive and are constructed as the switching element of said movement switch.

5. Switch arrangement according to claim 1, characterized in that the feeler rods are fixed in a common holder.

6. Switch arrangement according to claim 5, characterized in that the holder is electrically conductive at least sectionally and serves to connect the feeler rods to the emergency switch device.

* * * * *